United States Patent
Fields et al.

(10) Patent No.: US 12,413,057 B2
(45) Date of Patent: Sep. 9, 2025

(54) HIGH-VOLTAGE JUNCTION BOX MODULES AND ASSEMBLIES

(71) Applicant: Cummins Inc., Columbus, IN (US)

(72) Inventors: William Brent Fields, Seymour, IN (US); Joshua D. Greeno, Columbus, IN (US); Ryan A. Green, Columbus, IN (US); James Anthony Stumpf, Whiteland, IN (US); John P. O'Brien, Columbus, IN (US); Rishvanth Kora Venugopal, Bargersville, IN (US)

(73) Assignee: Cummins Inc., Columbus, IN (US)

( * ) Notice: Subject to any disclaimer, the term of this patent is extended or adjusted under 35 U.S.C. 154(b) by 7 days.

(21) Appl. No.: 18/600,154

(22) Filed: Mar. 8, 2024

(65) Prior Publication Data
US 2024/0356319 A1  Oct. 24, 2024

Related U.S. Application Data

(60) Provisional application No. 63/461,478, filed on Apr. 24, 2023.

(51) Int. Cl.
*B60R 16/023* (2006.01)
*H02G 3/08* (2006.01)
*H02G 3/14* (2006.01)

(52) U.S. Cl.
CPC ......... *H02G 3/086* (2013.01); *B60R 16/0238* (2013.01); *B60R 16/0239* (2013.01); *H02G 3/083* (2013.01); *H02G 3/14* (2013.01)

(58) Field of Classification Search
CPC .................. B60R 16/0239; B60R 16/0238
See application file for complete search history.

(56) References Cited

U.S. PATENT DOCUMENTS

| | | | |
|---|---|---|---|
| 11,932,186 B1* | 3/2024 | Verghese | H01M 10/425 |
| 2002/0141143 A1* | 10/2002 | Yamane | B60R 16/0238 361/601 |
| 2018/0083375 A1* | 3/2018 | Matsumura | B60R 16/0238 |
| 2019/0123495 A1* | 4/2019 | Darr | H01R 27/02 |
| 2020/0067293 A1* | 2/2020 | Oda | H05K 5/03 |
| 2020/0109843 A1* | 4/2020 | Bowen | F21V 23/04 |
| 2020/0335956 A1* | 10/2020 | Miyamoto | H02G 3/081 |
| 2022/0274494 A1 | 9/2022 | McKibben et al. | |
| 2022/0326743 A1* | 10/2022 | Kraft | B60R 16/0239 |
| 2024/0025362 A1* | 1/2024 | Samanta | H02B 13/025 |
| 2024/0306319 A1* | 9/2024 | Plamondon | B60R 16/0239 |

FOREIGN PATENT DOCUMENTS

| | | |
|---|---|---|
| CN | 1380728 A | 11/2002 |
| CN | 202282924 U | 6/2012 |

* cited by examiner

*Primary Examiner* — Hung V Ngo
(74) *Attorney, Agent, or Firm* — Faegre Drinker Biddle & Reath LLP

(57) ABSTRACT

A high-voltage junction box module includes: a housing; a plurality of electrical ports disposed at the first side of the housing; a plurality of buses contained within the housing and operatively controlling electrical flow and electrical connection between auxiliary electronic devices that are electrically coupled with the junction box module via the electrical ports; and at least one interface having one or more coupling sections disposed at one or more of the second side, the third side, the fourth side, the first section, or the second section of the housing. The interface physically and electrically couples the junction box module directly with an additional junction box module.

20 Claims, 15 Drawing Sheets

HIGH-VOLTAGE JUNCTION BOX MODULES AND ASSEMBLIES

CROSS-REFERENCE TO RELATED APPLICATION

The present application claims the benefit of U.S. Provisional Patent Application No. 63/461,478, filed Apr. 24, 2023, the disclosure of which is incorporated herein by reference in its entirety for all purposes.

FIELD OF THE DISCLOSURE

The present disclosure relates generally to systems or devices for electric charging and/or distribution, especially to junction boxes used for such electric charging and/or distribution.

BACKGROUND OF THE DISCLOSURE

Junction boxes control high-voltage connections for an electric charging system such as those involving a motor/inverter and an electric storage device such as a battery. Junction boxes that are designed for high-voltage electric energy transfer have an enclosure or housing that is capable of housing the components used for such energy transfer in order to protect the components from environmental conditions and accidental contact with other components or devices. Such high-voltage junction boxes may be predesigned and preassembled in factories before they are shipped to the users, such that the components inside the preassembled junction boxes remain in place when the junction boxes are installed.

SUMMARY OF THE DISCLOSURE

Various embodiments of the present disclosure relate to high-voltage junction box modules and systems or assemblies implementing the same. A high-voltage junction box module as disclosed herein includes: a housing having a first section and a second section opposing the first section, the housing having a first side, a second side, a third side, and a fourth side extending from the first section to the second section; a plurality of electrical ports disposed at the first side of the housing; a plurality of buses contained within the housing and configured to operatively control electrical flow and electrical connection between auxiliary electronic devices that are electrically coupled with the junction box module via the electrical ports; and at least one interface having one or more coupling sections disposed at one or more of the second side, the third side, the fourth side, the first section, or the second section, the interface configured to physically and electrically couple the junction box module directly with an additional junction box module.

In some examples, the additional junction box module includes additional electrical ports. In some examples, the at least one interface is configured to detachably couple the additional junction box module with the junction box module. In some examples, the additional junction box module includes an additional housing including a plurality of additional electrical ports disposed at the additional housing. In some examples, the electrical ports are configured to facilitate transfer of electric current range of from about 5 amperes to about 20 amperes or of electric voltage range of from about 400 DC volts to about 800 DC volts.

In some examples, the junction box module includes a safety switch. The housing includes a removable lid coupled to the first section or the second section, and the removable lid is functionally coupled with the safety switch. The safety switch is configured to detect a presence or absence of the removable lid. In some examples, the electrical ports includes a test port configured to indicate presence of a residual voltage inside the junction box module. In some examples, the auxiliary electronic devices include one or more of: a battery, a fuel cell, a vehicle accessory, or an AC-to-DC inverter. In some examples, the second side of the housing includes a first interface configured to physically and electrically couple the junction box module directly with a first additional junction box module, and the third side of the housing includes a second interface configured to physically and electrically couple the junction box module directly with a second additional junction box module.

In some examples, the second side and the third side are two adjacent sides of the housing. In some examples, the second side and the fourth side are two opposing sides of the housing. In some examples, the first section of the housing includes a third interface configured to physically and electrically couple the junction box module directly with a third additional junction box module. In some examples, the second section of the housing includes a fourth interface configured to physically and electrically couple the junction box module directly with a fourth additional junction box module.

A high-voltage junction box assembly as disclosed herein includes a primary high-voltage junction box module. The primary high-voltage junction box module includes: a primary housing, a plurality of primary electrical ports disposed at the primary housing, and a first connection bus contained within the primary housing and configured to operatively control electrical flow and electrical connection between primary auxiliary electronic devices that are electrically coupled with the primary junction box module via the primary electrical ports. The high-voltage junction box assembly further includes a secondary high-voltage junction box module coupled to the primary high-voltage junction box module. The secondary high-voltage junction box module includes: a secondary housing, a plurality of secondary electrical ports disposed at the secondary housing, and a second connection bus contained within the secondary housing and configured to operatively control electrical flow and electrical connection between secondary auxiliary electronic devices that are electrically coupled with the secondary junction box module via the secondary electrical ports. The primary housing and the secondary housing are removably coupled via an interface including one or more coupling sections disposed at the primary housing or the secondary housing, the interface configured to physically and electrically couple the primary junction box module directly with the secondary junction box module.

In some examples, the high-voltage junction box assembly further includes a third high-voltage junction box module coupled to the primary high-voltage junction box module. In some examples, the interface is configured to detachably couple the secondary high-voltage junction box module with the primary high-voltage junction box module. In some examples, the primary and secondary electrical ports are configured to facilitate transfer of electric current range of from about 5 amperes to about 20 amperes or of electric voltage range of from about 400 DC volts to about 800 DC volts. In some examples, at least one of the primary and secondary high-voltage junction box modules includes a safety switch. The primary or secondary housing includes a removable lid, and the removable lid is functionally coupled with the safety switch. The safety switch is configured to detect a presence or absence of the removable lid. In some examples, the primary or secondary electrical ports includes a test port configured to indicate presence of a residual voltage inside the primary and secondary junction box modules. In some examples, the primary and secondary auxiliary electronic devices include one or more of: a battery, a fuel cell, a vehicle accessory, or an AC-to-DC inverter.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

Figure 1A:
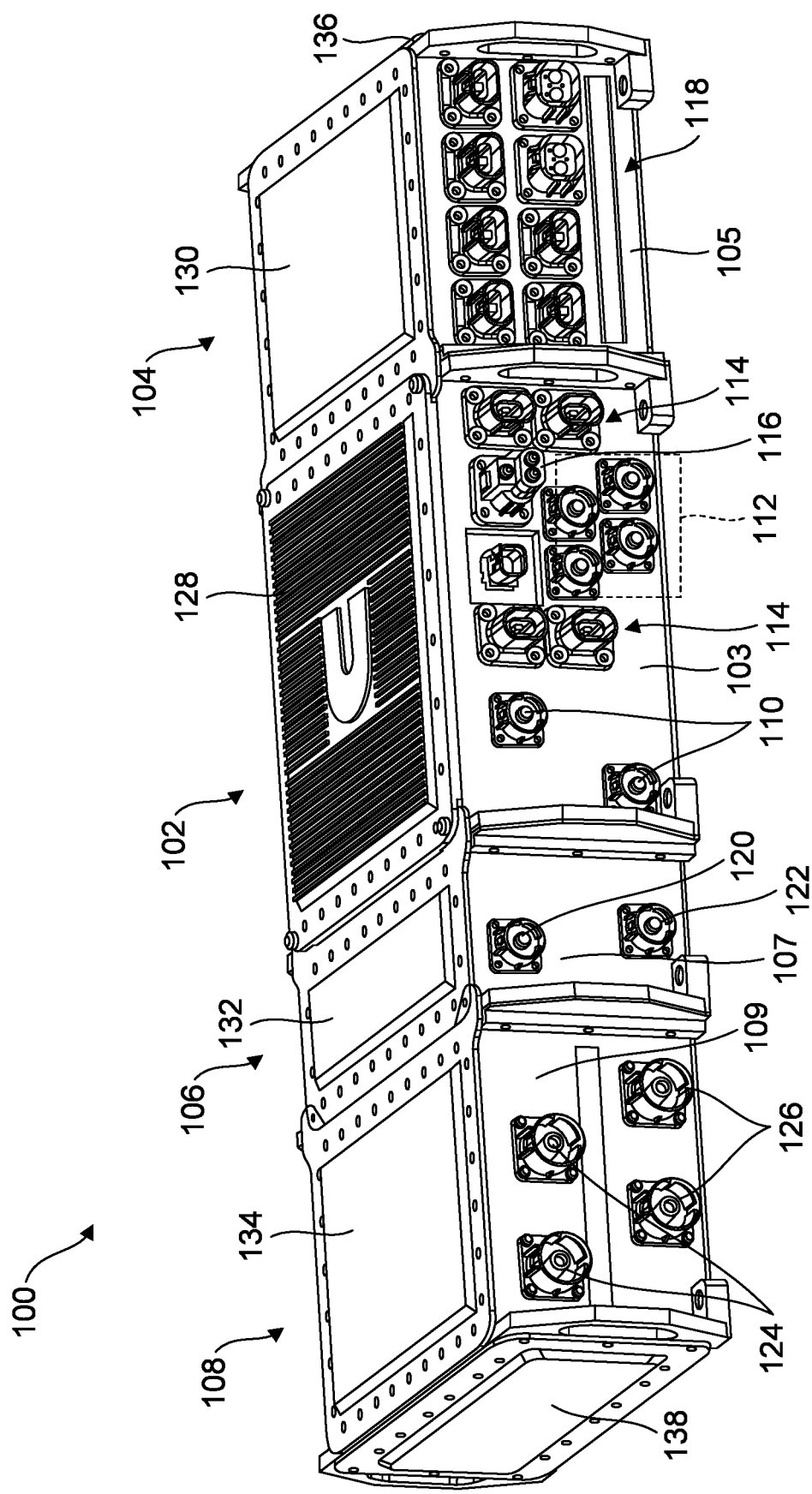
FIG. 1A is an angled front view of an exterior of a high voltage junction box assembly according to embodiments disclosed herein.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electro-magnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

High voltage junction boxes as known in the art are typically custom-designed and manufactured for specific applications such as a certain model of machine or device into which the junction boxes are installed. For example, a provider of junction boxes may have multiple sizes based on the package constraints and system requirements, such as a specific type or model of vehicle. As such, there is very little commonality among the designs such that for different types of models of vehicles, for example, it would be necessary for different types of junction box to be separately designed and manufactured in order to accommodate the physical and electrical requirements of the type or model of vehicle in which the junction box is to be installed.

In the present disclosure, however, the junction boxes are made of a plurality of modular components or modules which are interchangeable to a degree such that they add flexibility in the functionality of the junction boxes and allow the junction box assembly to be customizable according to the different needs of the user. For example, a base module component may have one or more additional components attached or coupled therewith, such that these components are used as building blocks for the junction box assembly, where the final design can be chosen to accommodate the physical and electrical requirements of multiple different types of applications instead of being predesigned and premade to only be implemented in one specific application.

Figure 1B:
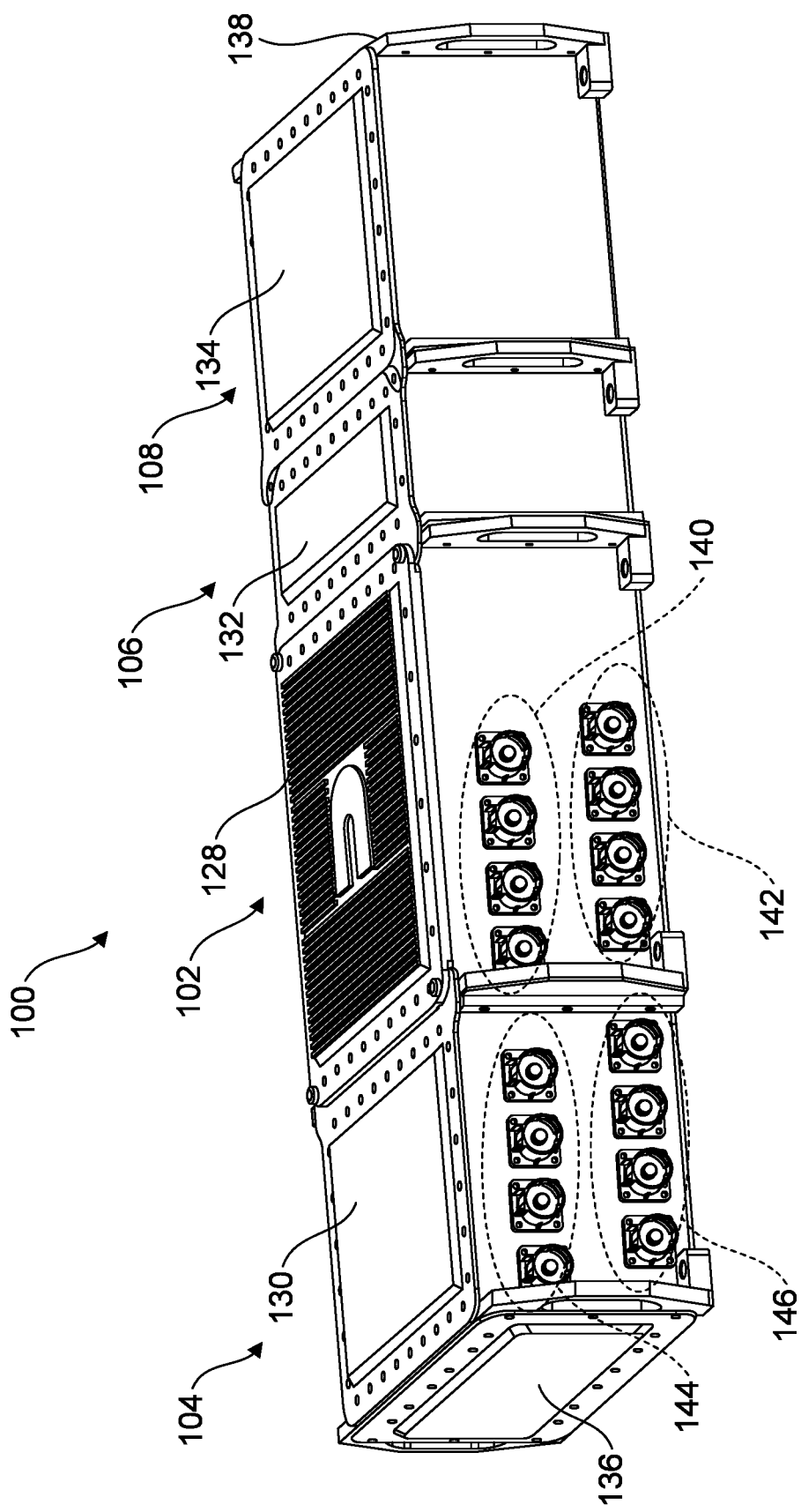
FIG. 1B is an angled rear view of the exterior of the high voltage junction box assembly of FIG. 1A according to embodiments disclosed herein.

FIGS. 1A and 1B show the exterior of a high voltage junction box assembly 100 according to an example as disclosed, with multiple modular components. For example, the assembly 100 may be implemented in an electric vehicle (EV), a vehicle using a fuel cell, or a combination/hybrid thereof. In the example shown, there are four (4) modular components or modules: a base module (also referred to herein as a "mother box" module or primary module) 102 with its own housing 103, a first additional module (e.g., an EV/fuel cell power box according to some examples) 104 with its own housing 105, a second additional module (e.g., a secondary charge box according to some examples) 106 with its own housing 107, and a third additional module (e.g., an opportunity charge box according to some examples) 108 with its own housing 109. Any of the additional modules may be referred to as a secondary module. The base module 102 includes a plurality of ports as shown, including, but not limited to, primary charge port connections 110, traction inverter ports 112, accessory ports 114, and a test port 116. The test port 116 may indicate presence of a residual voltage inside the base module 102. The functionality of the base module 102, for example, may be to act as a central distribution device for high voltage components of an EV application, for example to interconnect with multiple devices or external components via input and output connections. For example, the base module 102 may provide a central location for accessing fuses for serviceability, as further explained herein. For example, the base module 102 may provide protection of the assembly 100 from high voltage.

In some examples, the base module 102 may include the aforementioned ports, e.g., charge port, battery ports, accessory ports, test port, traction inverter ports, etc., as well as any additional ports which may be implemented as known in the art. In some examples, the base module 102 may further include a master access safety switch which can be used by a technician when servicing the assembly 100 for safety purposes. In some examples, the base module 102 may house or include a master high voltage interlock loop (HVIL) connection which is a safety feature of an electrical system such as hybrid and all-electric vehicles that protects people during the assembly, repair, maintenance, and operation of the system or vehicle. In some examples, the HVIL connection is implemented via an HVIL board. In some examples, the base module 102 may be designed with minimal fuses installed therein such that the additionally required fuses may be housed in the additional modules, as further explained herein. Furthermore, the base module 102 may include positive battery connections 140 and negative battery connections 142.

Coupled to one side of the base module 102 is the additional module 104 which includes additional accessory ports 118. The additional module 104 may be an EV/fuel cell power box which may be used to connect a DC-to-DC converter of a fuel cell (not shown) into a high voltage system via the assembly 100. Furthermore, the additional module 104 may include additional positive battery connections 144 and additional negative battery connections 146.

Coupled to another side of the base module 102 opposite from the additional module 104 is the additional module 106 which includes a positive input 120 and a negative input 122 of a secondary charge port. The additional module 106 may be a secondary charge box which provides a secondary charge port to be used in applications where the user may need to utilize multiple location on the electric system such as a vehicle to charge from for convenience.

Further coupled to the additional module 104 on the side opposite from the base module 102 is the additional module 108 which includes positive inputs 124 and negative inputs 126 for inductive or pantograph charging, for example. The additional module 108 may be an opportunity charge box to be used to connect additional charging methods (e.g., overhead or inductive) into the high voltage system, for example.

The assembly 100 includes multiple covers or lids disposed on the individual modules. The covers or lids that are shown include: a top lid 128 for the base module 102, a top lid 130 for the additional module 104, a top lid 132 for the additional module 106, a top lid 134 of the additional module 108, a closing end or side lid 136 for the additional module 104, and a closing end or side lid 138 for the additional module 108. Although not visible, it is to be understood that there may be additional lids on the bottom, for example opposing the top lids 128, 130, 132, and 134, so as to provide bottom lids for additional protection and to completely enclose the internal components of these modules, as suitable. In some examples, these covers or lids may be made of an electrically nonconductive material or a nonmagnetic material, for example.

Figure 2A:
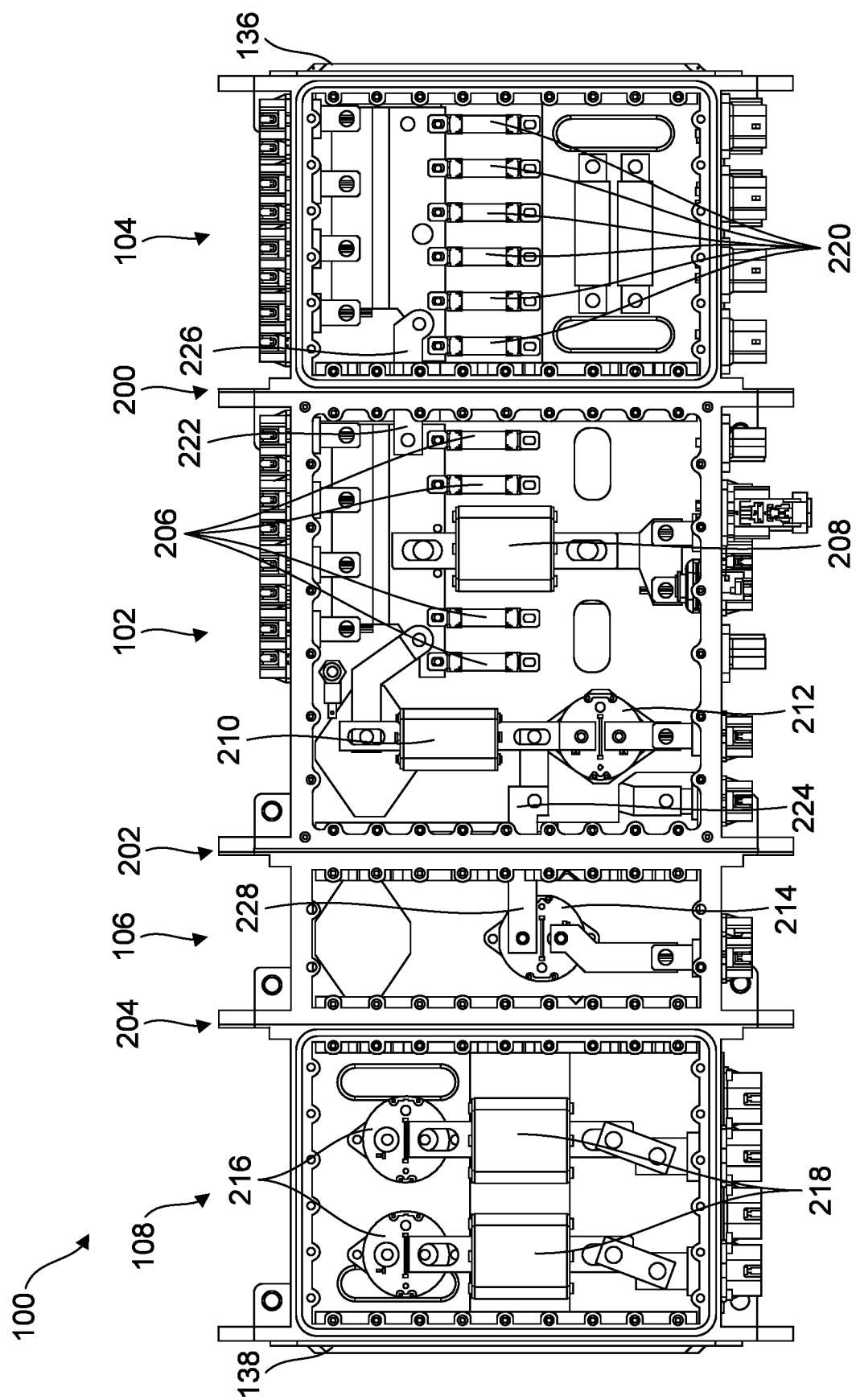
FIG. 2A is a top view of an interior of the high voltage junction box assembly of FIGS. 1A and 1B according to embodiments disclosed herein.
Figure 2B:
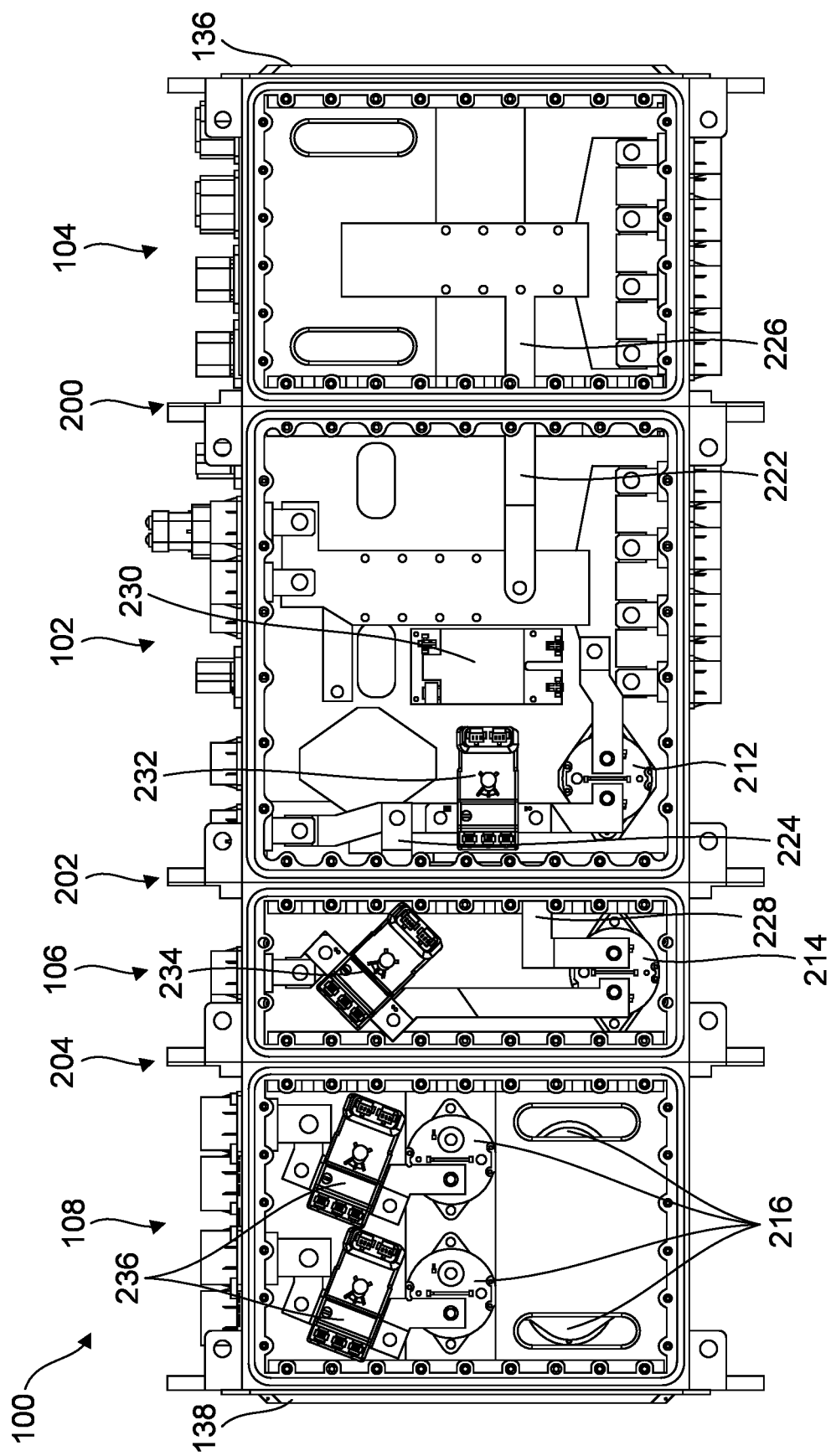
FIG. 2B is a bottom view of the interior of the high voltage junction box assembly of FIGS. 1A and 1B according to embodiments disclosed herein.

In some examples, portions of the lids are overlapping (or interlocking), for example as shown in FIGS. 1A and 2B, such that a portion of the lid 132 is disposed over a portion of the lid 134, a portion of the lid 128 is disposed over a different portion of the lid 132, and a different portion of the lid 128 is disposed over a portion of the lid 130. As such, when the lids are all attached or affixed to their respective modules, it would be necessary to remove the overlapping or upper lid(s) in order to remove the lower lid(s), e.g., the lid 134 can be completely removed only if the lid 132 is also removed, and the lids 132 and 130 can be completely removed only if the lid 128 is also removed. These overlapping lids can provide additional safety feature such that a technician would not mistakenly remove the lids in the wrong order, or to enable a safety switch functionally coupled with the removable lid to detect a presence or absence of the lid, such that the safety switch is activated when any one of the lids is removed, for example.

FIGS. 2A and 2B show the interior of the high voltage junction box assembly 100 according to an example as disclosed, with multiple modular components. The assembly 100 includes three (3) connections: a first connection 200, a second connection 202, and a third connection 204. The first connection 200 couples the base module 102 with the additional module 104, the second connection 202 couples the base module 102 with the additional module 106, and the third connection 204 couples the additional module 106 with the additional module 108. It is to be understood that the coupling may be electrical, mechanical, or both, and it is to be also understood that the coupling may be direct (two or more components are directly coupled to each other, such as without any additional component between the coupled components) or indirect (two or more components are coupled to each other through at least one intermediate component such as via wiring), as suitable.

For example, the base module 102 includes a plurality of fuses: accessory fuses 206, a traction inverter fuse 208, and a charging fuse 210. The traction inverter fuse 208 may be implemented in an EV vehicle to protect the wire of the vehicle's inverter (not shown), and the charging fuse 210 may be a fuse that protects a connected battery (not shown) from charging at too high a rate. The accessory fuses 206 may be configured to protect additional components which may be connected to the base module 102 via the accessory ports 114, for example. The base module 102 also includes charging contactors 212 configured to switch power to any of the loads supplied by a traction battery in an EV system, for example. The base module 102 also includes an isolation monitor 230 such as a line isolation monitor or a ground electrical isolation monitor, as well as a voltage sensor 232 for monitoring voltage level in a connection bus or wire.

In some examples, the additional module 104 includes additional accessory fuses 220 configured to protect additional components which may be connected to the additional module 104 via the additional accessory ports 118 or to protect the component connected to the secondary charge port via the positive inputs 124 and negative inputs 126 for the inductive or pantograph charging, for example. The additional module 106 includes additional charging contactors 214 and a voltage sensor 234. The additional module 108 includes additional charging contactors 216 coupled with additional charging fuses 218, as well as voltage sensors 236 coupled with the charging contactors 216.

The base module 102 includes two connection buses 222 and 224. Each of the connection buses 222, 224 may be coupled with any one or more of: the fuses (e.g., 206, 208, and 210), the traction inverter ports 112, and the battery connections 140, 142. The connection buses 222, 224 may be implemented as one or more busbars. The additional module 104 has a connection bus 226 which may be coupled with the additional fuses 220 as well as the additional battery connections 144, 146. The additional module 106 also has a connection bus 228 coupled with the charging contactors 214 and the inputs 120, 122 for the secondary charge port. The connection buses 222, 224, 226, and 228 facilitate electrical connection therebetween such that when the modules 102, 104, and 106 are assembled into the assembly 100, these modules are electrically coupled with one another via the connection buses. In some examples, the electrical coupling may be facilitated via soldering, brazing, or any other suitable technique of electrical and mechanical coupling as known in the art. Furthermore, the buses 222, 224, 226, and 228 operatively facilitate or control electrical flow and electrical connection between auxiliary electronic devices (not shown) that are electrically coupled with the module 102, 104, 106, and/or 108 via the electrical ports, such as at any one or more of the ports 110, 112, 114, 116, 120, 122, 124, 126, 140, 142, 144, 146, and/or 300 as shown, for example.

As such, the locations of the connection buses are configured such that when two neighboring modules are physically and adjacently positioned with respect to each other, the connection buses would come into contact with each other to facilitate electrical coupling of the modules. For example, the end of the connection bus 222 coincides with the end of the connection bus 226 when the modules 102 and 104 are disposed side-by-side, and the end of the connection bus 224 coincides with the end of the connection bus 228 when the modules 102 and 106 are disposed side-by-side, so as to form a continuous physical busbar that is segmented but electrically couplable. In some examples, a module may not include a connection bus that is configured to couple with another connection bus, as is the case with the additional module 108, when there is no need to electrically couple two modules together or when only a physical coupling is sufficient, such as the physical coupling between the additional modules 106 and 108.

Figure 3:
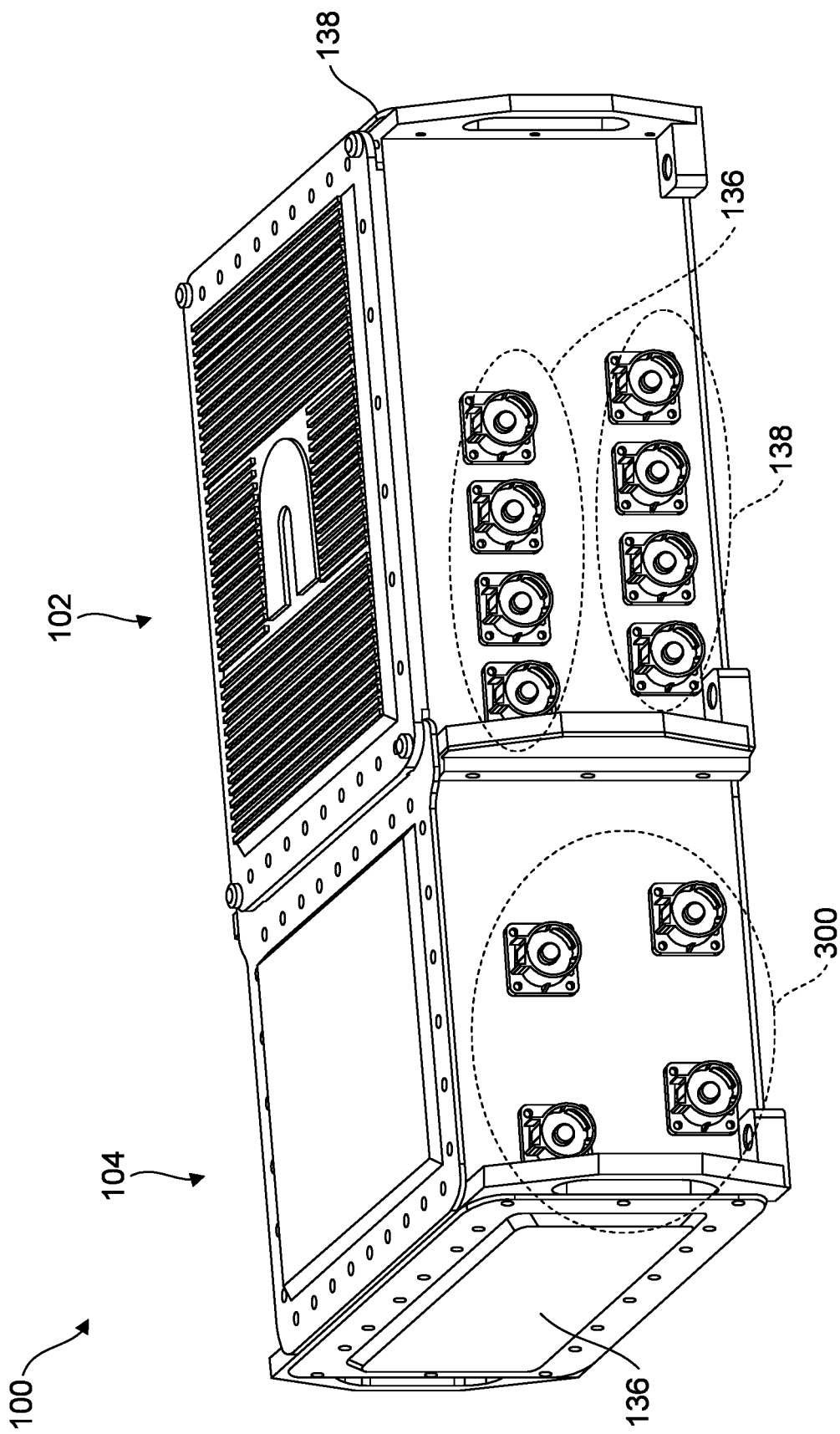
FIG. 3 is an angled front view of an example of a high voltage junction box assembly according to embodiments disclosed herein.
Figure 4:
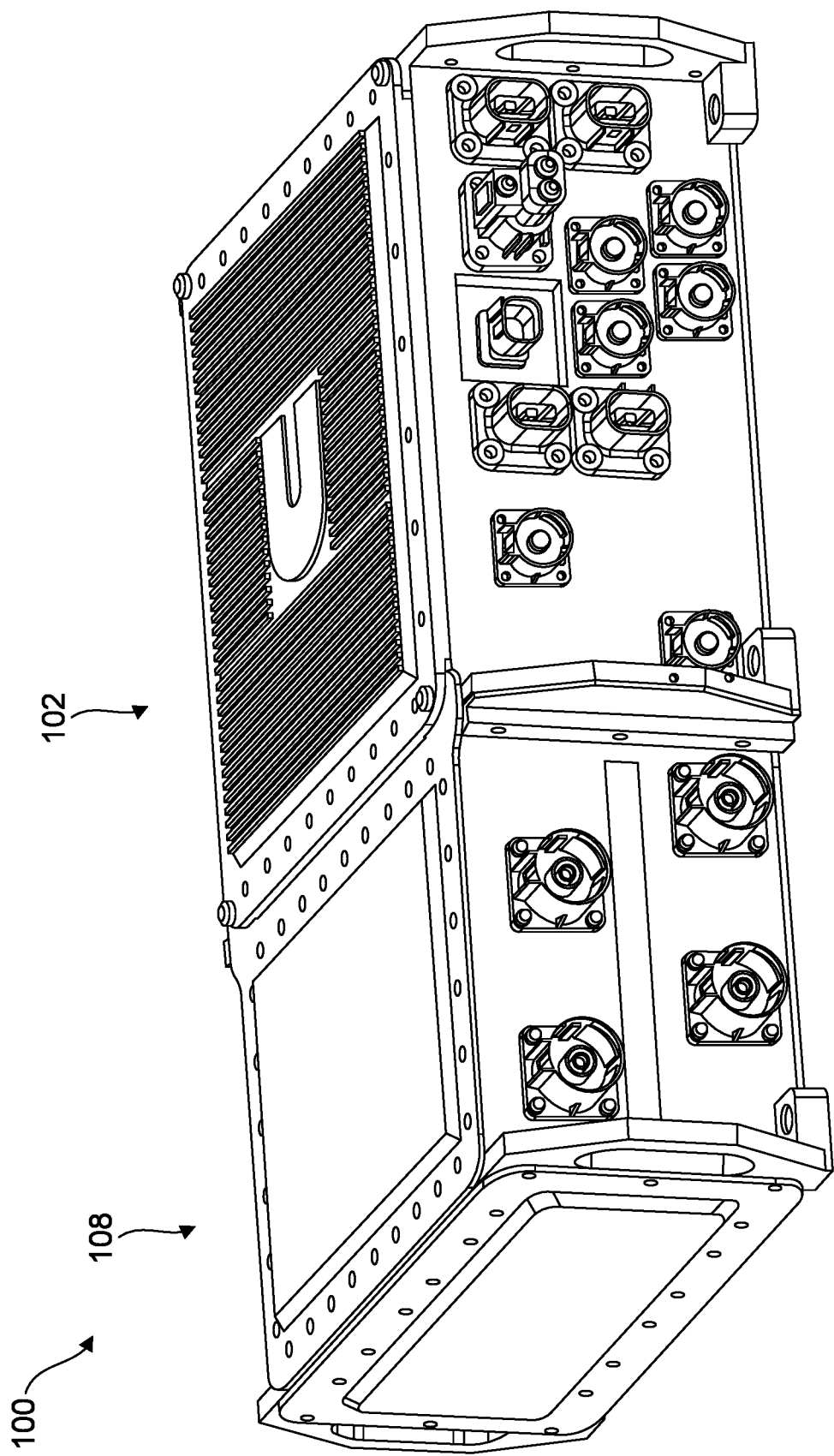
FIG. 4 is an angled front view of an example of a high voltage junction box assembly according to embodiments disclosed herein.
Figure 5:
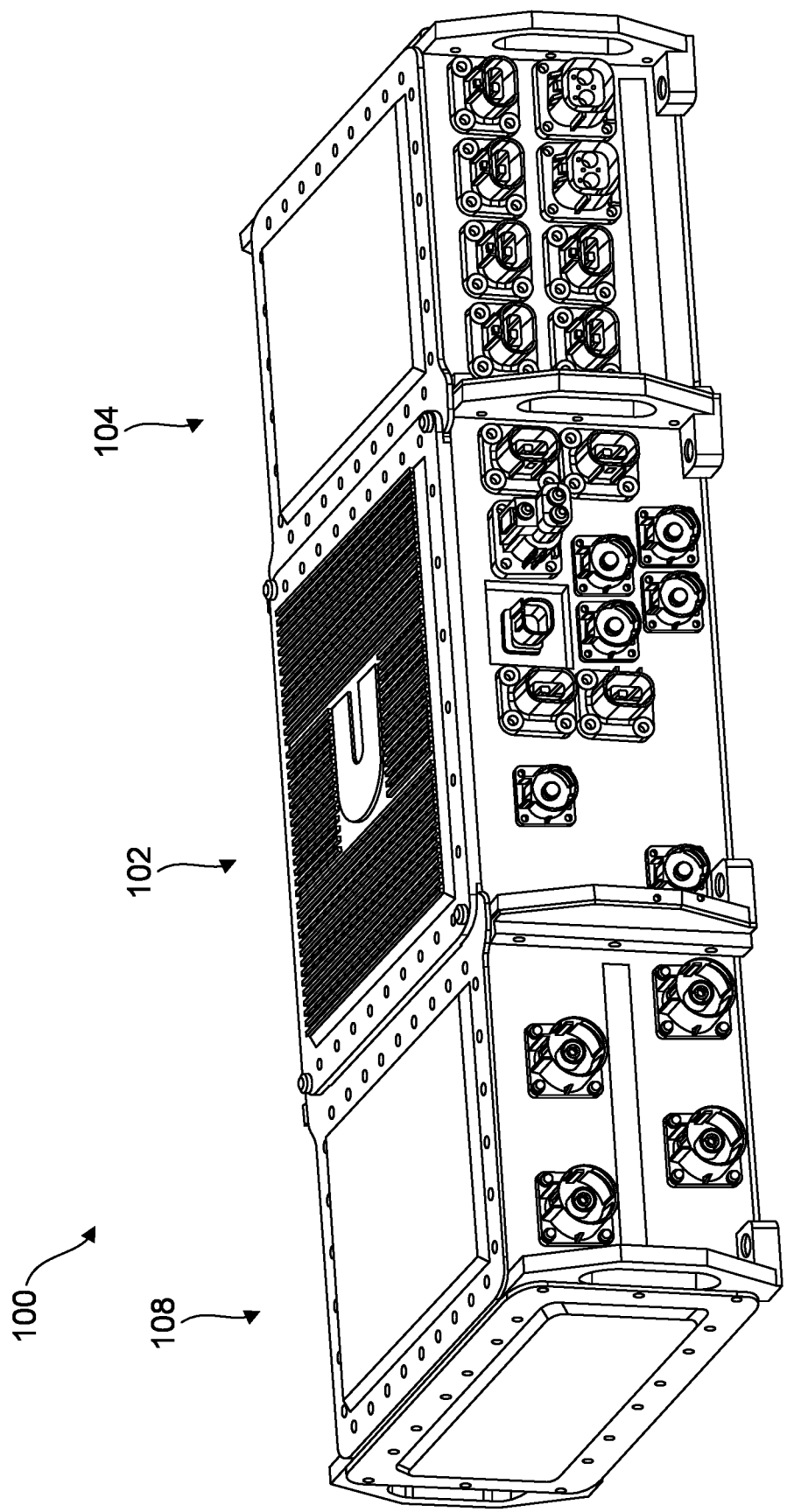
FIG. 5 is an angled front view of an example of a high voltage junction box assembly according to embodiments disclosed herein.
Figure 6:
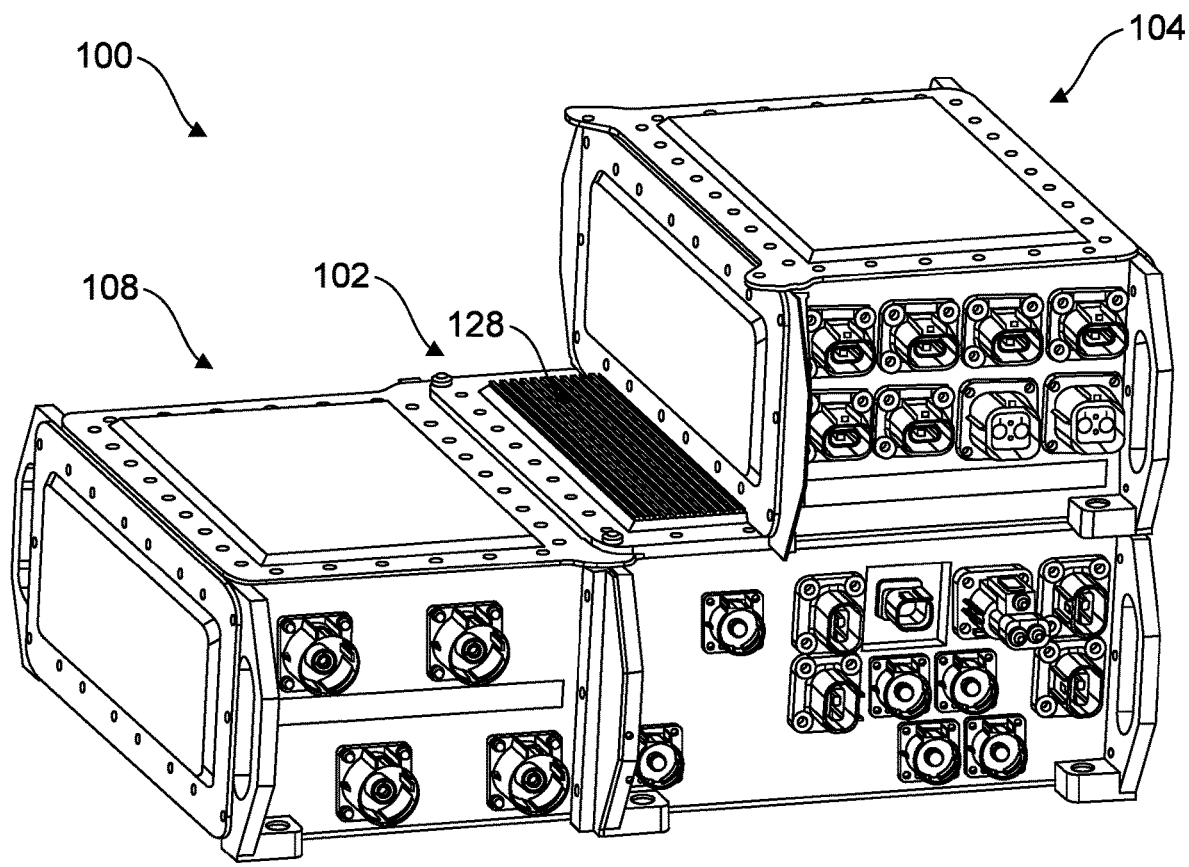
FIG. 6 is an angled front view of an example of a high voltage junction box assembly according to embodiments disclosed herein.
Figure 7:
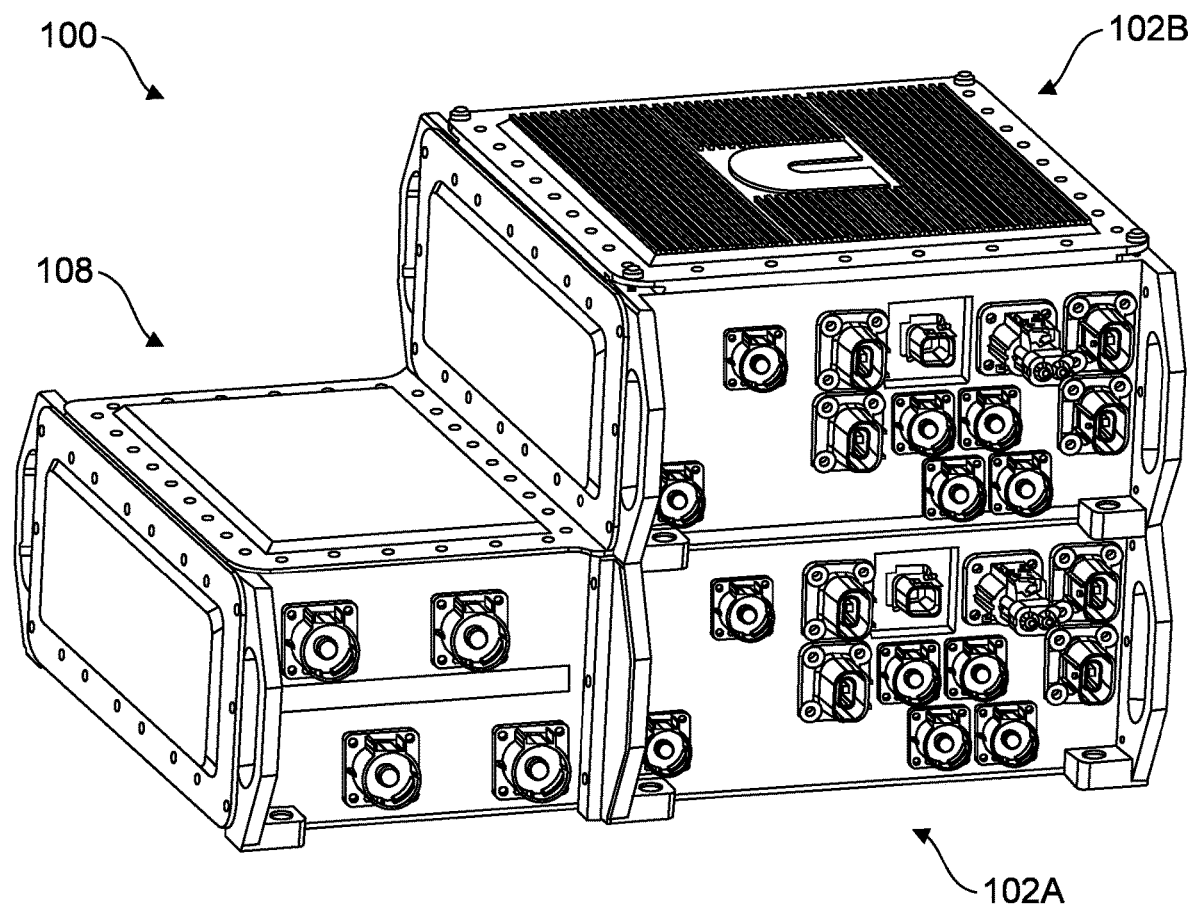
FIG. 7 is an angled front view of an example of a high voltage junction box assembly according to embodiments disclosed herein.
Figure 8:
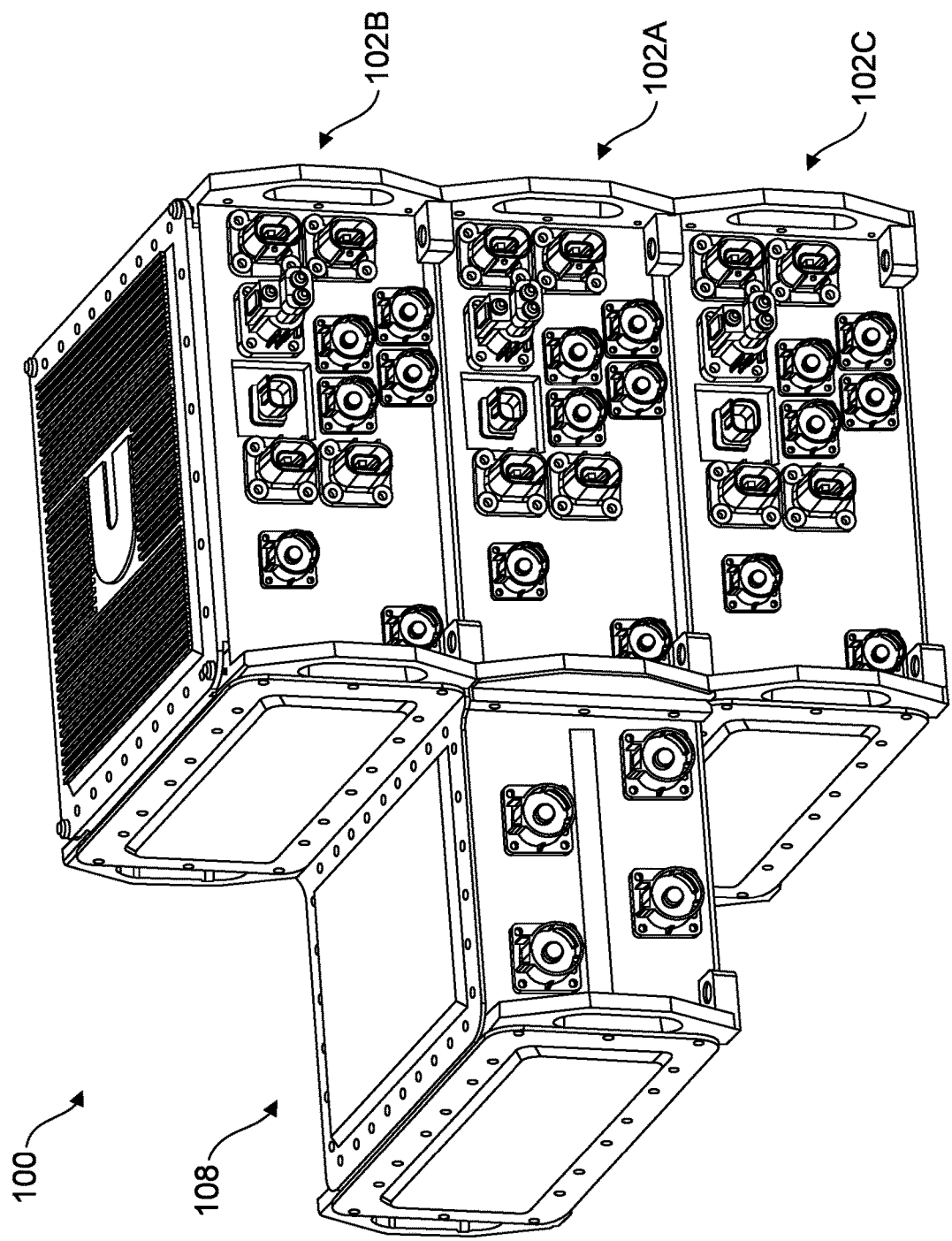
FIG. 8 is an angled front view of an example of a high voltage junction box assembly according to embodiments disclosed herein.
Figure 9:
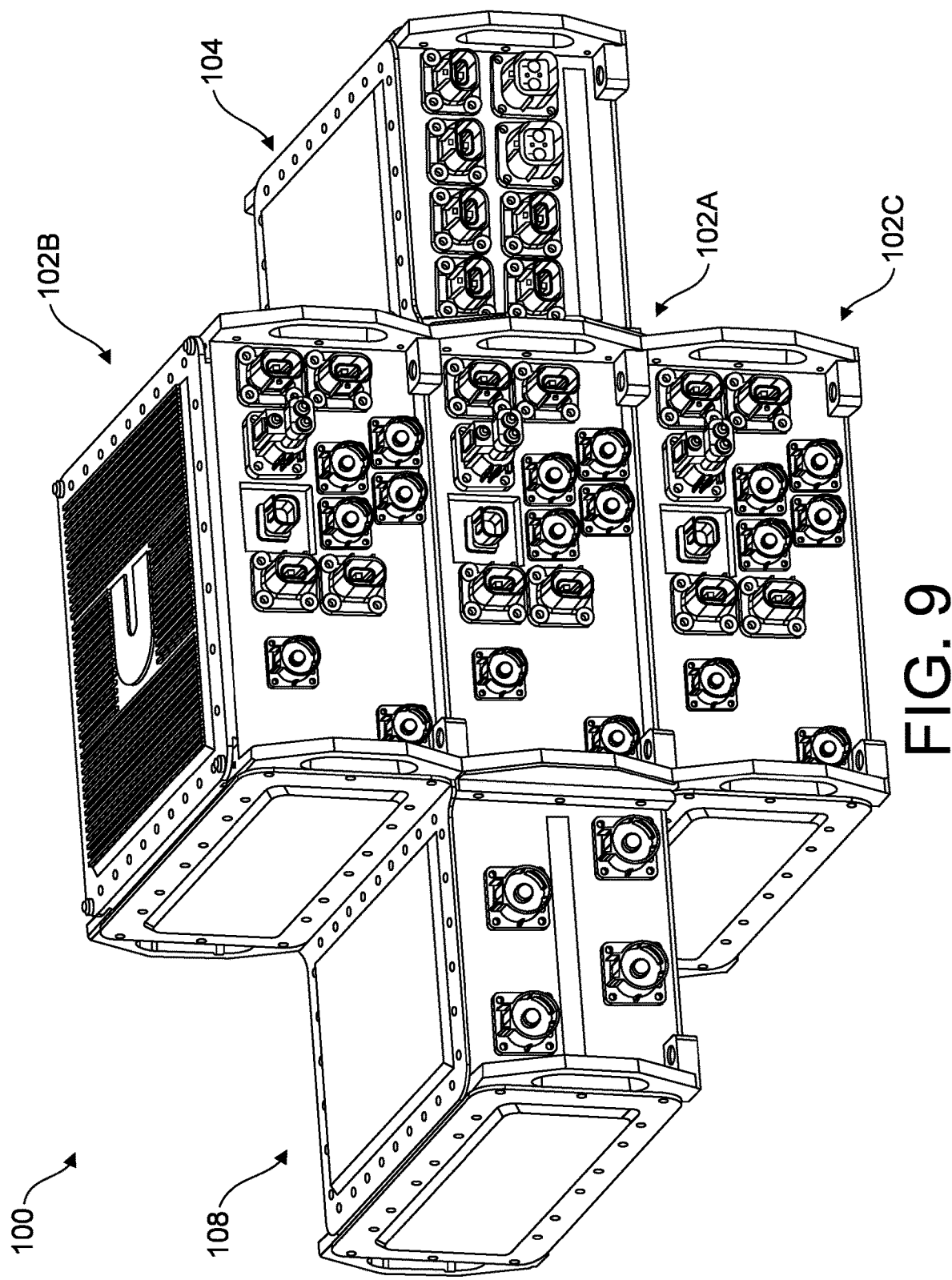
FIG. 9 is an angled front view of an example of a high voltage junction box assembly according to embodiments disclosed herein.

Other examples of different combinations and options of assembly are disclosed in subsequent figures. For example, FIG. 3 shows an embodiment of the assembly 100 where the additional module 104 has fuel cell electrolyzer ports 300 instead of the additional battery connections 144, 146. Such assembly 100 may be used for vehicles operated using a fuel cell instead of a battery, and the assembly 100 may include just one additional module 104 instead of three additional modules (104, 106, and 108) as shown in FIGS. 1A and 1B. In such examples, the closing end or side lid 138 may be disposed on a side of the base module 102 opposing the additional module 104 as shown. In FIG. 4, the additional module 108 is directly coupled with the base module 102 without the additional modules 104 and 106. In FIG. 5, the additional module 104 is included such that it is coupled to the base module 102 opposite to the side of the additional module 108. In FIG. 6, the additional module 104 is disposed on top of the base module 102 instead of at the side, such that the bottom of the additional module 104 is coupled to the top lid 128 of the base module 102. In FIG. 7, there are two (2) base modules 102A and 102B such that the second base module 102B is disposed on top of the first base module 102A, and the additional module 108 is coupled to the first base module 102A. In FIG. 8, there are three (3) base modules 102A, 102B, and 102C such that the third base module 102C is disposed at the bottom of the first base module 102A. In FIG. 9, the additional module 104 is coupled to the first base module 102A located at the center, forming a cross-shaped configuration of the assembly 100. The additional module(s) may be directly coupled with the base module physically and electrically, for example, in any planar direction so as to be coplanar with or to share a common axis with the base module. Any other suitable combination or configuration may be implemented as suitable.

Figure 10:
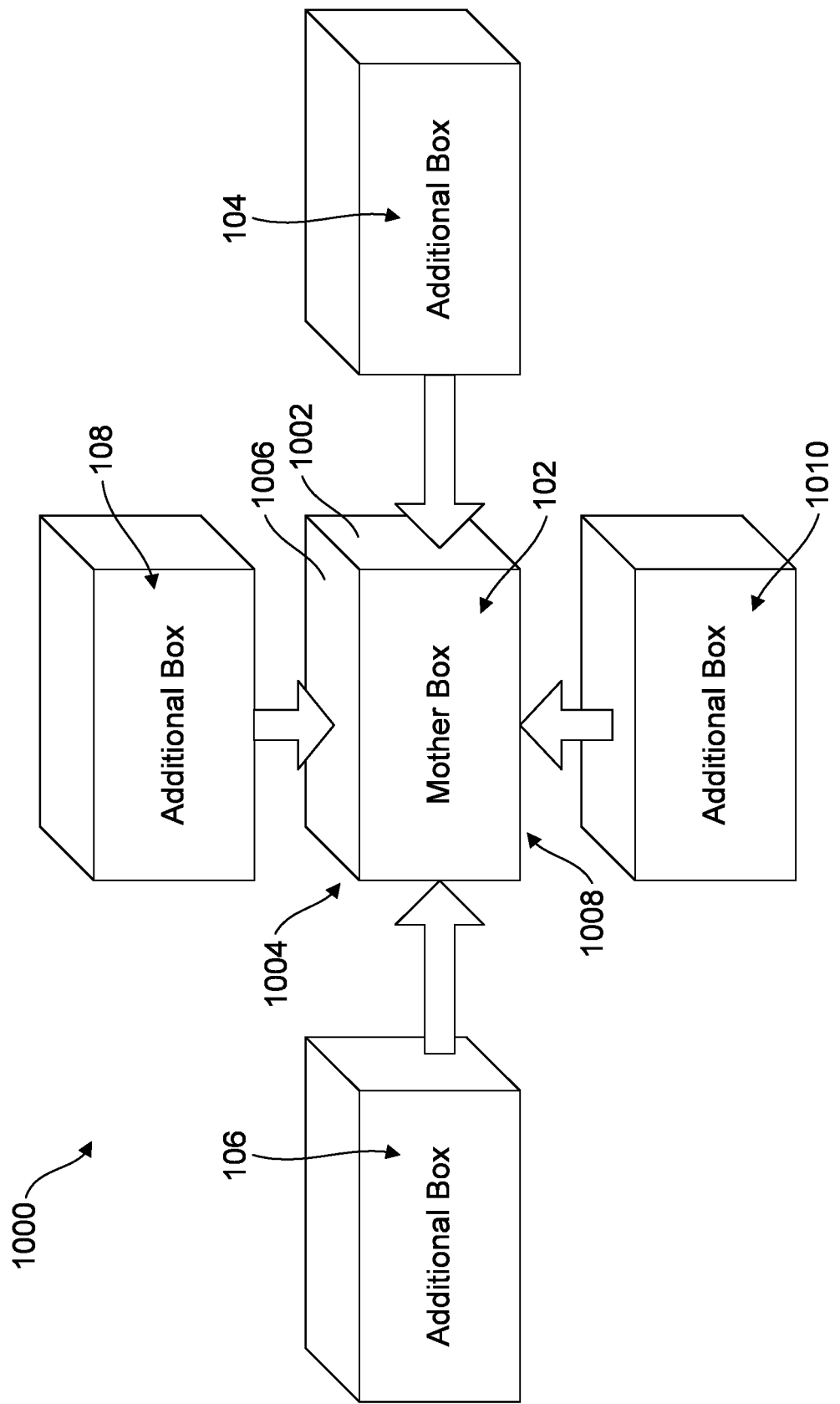
FIG. 10 is a schematic diagram of a high voltage junction box assembly according to embodiments disclosed herein.

FIG. 10 shows an example of a high voltage junction box assembly 1000 according to embodiments disclosed herein. The base module 102 (the "mother box") can be configured to couple with up to four (4) additional modules (the "additional boxes"). The additional module 104 is configured to be coupled with the base module 102 at a first interface 1002, the additional module 106 is configured to be coupled with the base module 102 at a second interface 1004, the additional module 108 is configured to be coupled with the base module 102 at a third interface 1006, and a fourth additional module 1010 is configured to be coupled with the base module 102 at a fourth interface 1008. It is to be understood that the additional modules 104, 106, 108, and 1010 are interchangeable in their functionality and is not limited to just the examples shown in FIGS. 1A and 1B.

Figure 11A:
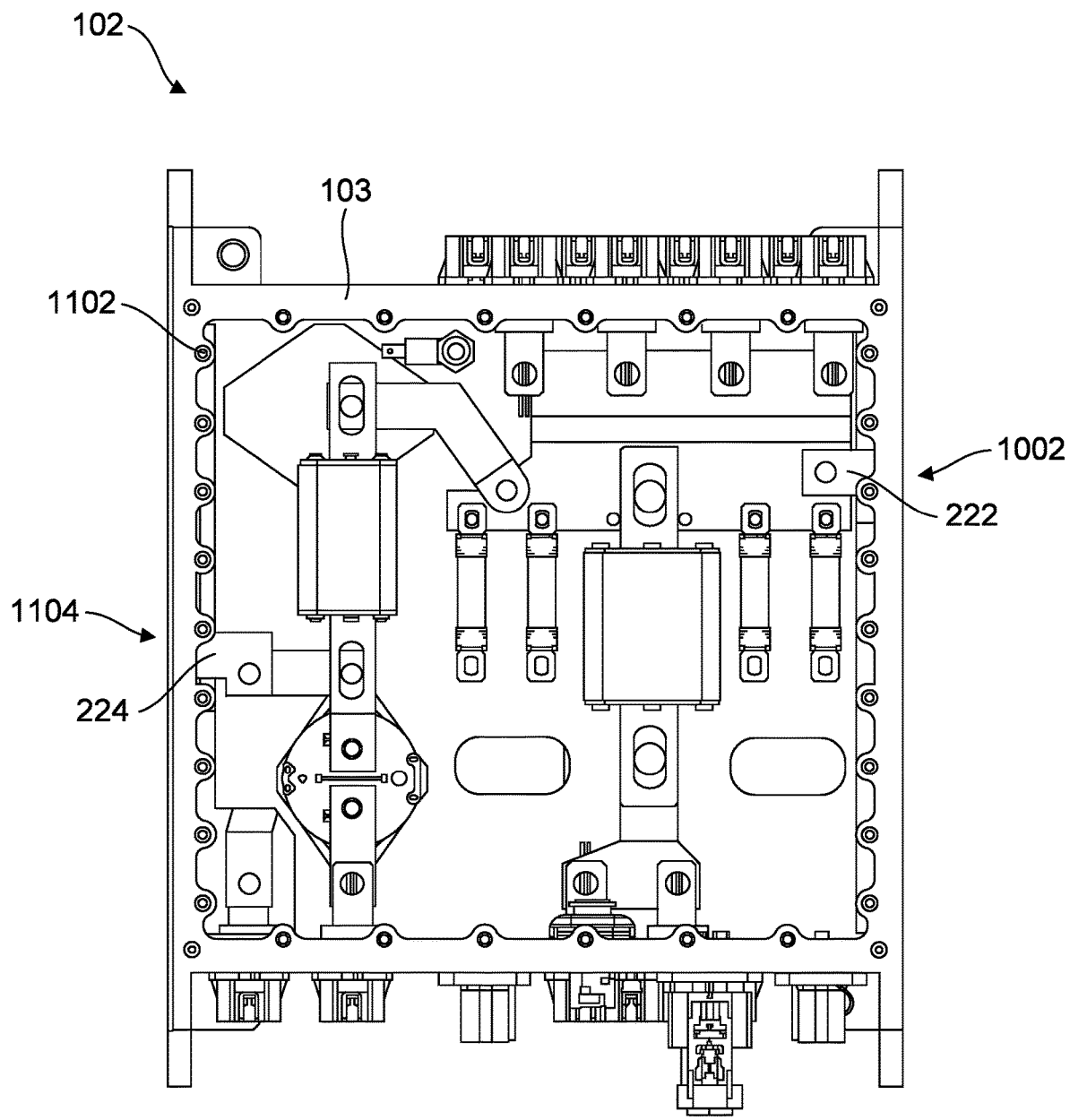
FIG. 11A is a top view of an interior of a base module of a high voltage junction box assembly according to embodiments disclosed herein.
Figure 11B:
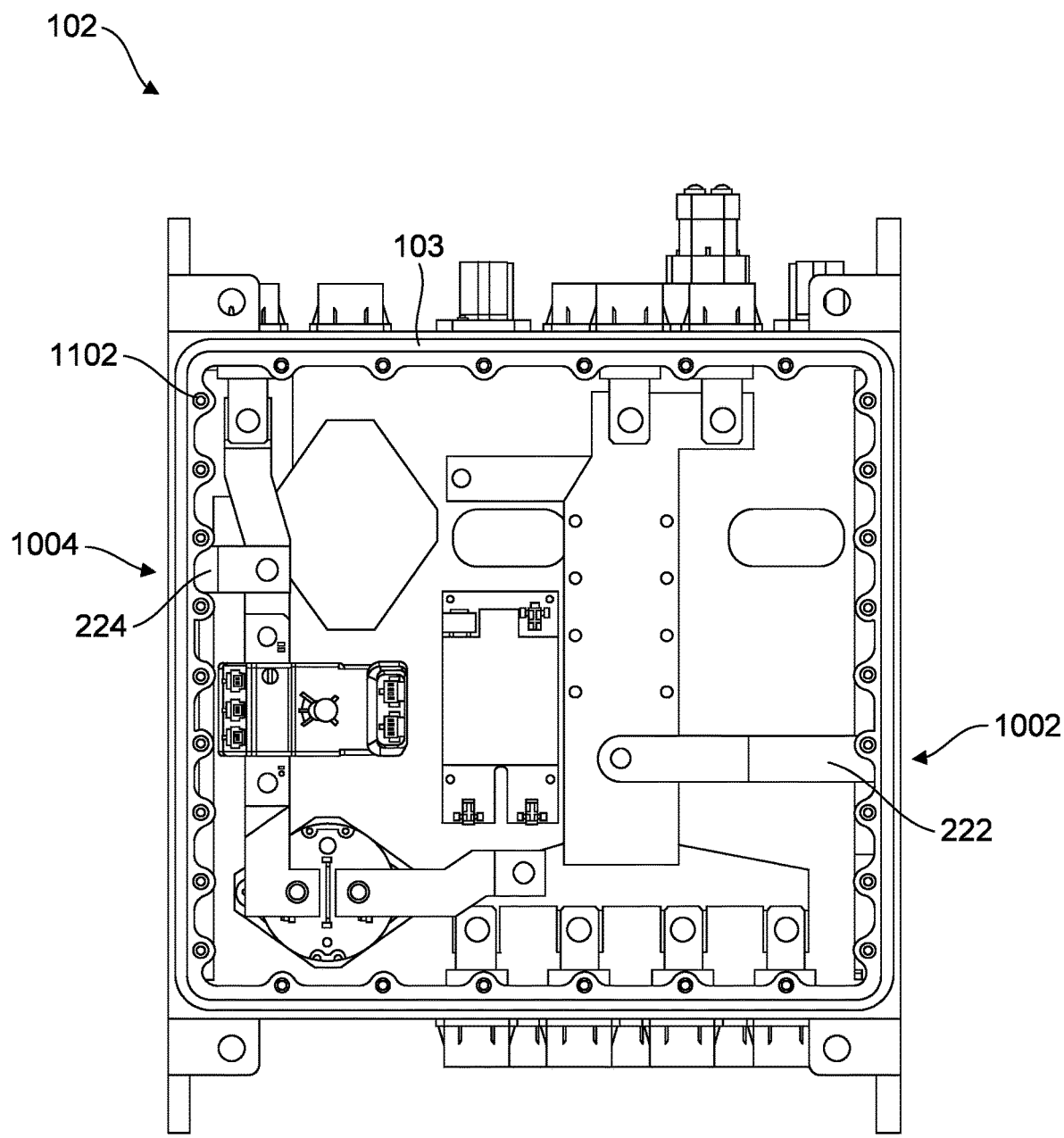
FIG. 11B is a bottom view of the interior of the base module of FIG. 11A according to embodiments disclosed herein.
Figure 11C:
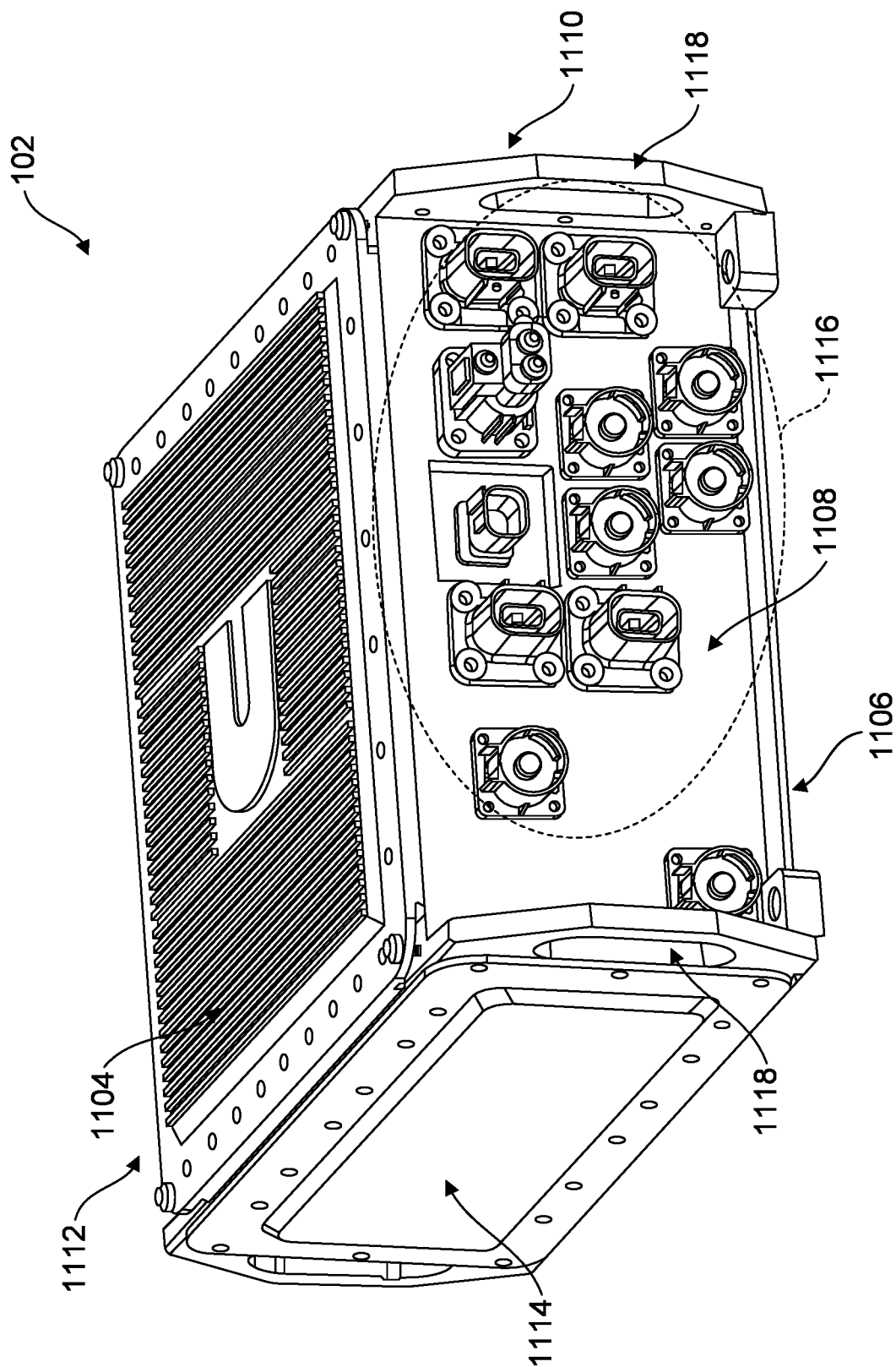
FIG. 11C is an angled front view of an exterior of the base module of FIG. 11A according to embodiments disclosed herein.

FIGS. 11A through 11C show an example of a base module 102, where the interfaces 1002 and 1004 define at least a portion of a side of a housing 103 of the base module 102, which provides the structural integrity of the base module 102. The housing 103 includes one or more coupling sections 1102 such as a plurality of bolt holes or openings which can be used for mechanically coupling the housing 103 of the base module 102 with a housing of an additional module (not shown) such that an electrical connection between the connection bar 222 or 224 with a corresponding connection bar of the additional module is maintained. The mechanical coupling is detachable such that removing the coupling members such as the bolts would allow the modules to be detached or decoupled from each other. The housing 103 may be made of an electrically nonconductive material or a nonmagnetic material, for example. In some examples, the housings of two or more (or all) of the modules may be the substantially similar or identical, such that a single casing design may be utilized for all modules to reduce cost and avoid having to design a new casing for a new module. In such cases, only the internal components may be changed to build a different module, as additional convenience for the manufacturers. Additional housing(s) may include additional electrical port(s) disposed at the additional housing.

Generally, a housing (including but not limited to the housing 103, 105, 107, 109) as disclosed herein includes a first section 1104 which may also be referred to as a top section, a second section 1106 which may also be referred to as a bottom section that is opposite from the first section 1104, and a plurality of sides such as a first side 1108, a second side 1110, a third side 1112, and a fourth side 1114, as suitable, which extend from the first section 1104 to the second section 1106 to form the housing. The first side 1108 is adjacent to both the second side 1110 and the fourth side 1114, and the third side 1112 is opposite from the first side 1108. The second side 1110 and the fourth side 1114 are opposite of each other. The second side 1110 and the third side 1112 are adjacent to each other.

The first side 1108 may include a plurality of ports 1116 including but not limited to any of the ports as disclosed herein, such as the ports 110, 112, 114, and 116 as shown in FIG. 1A. The ports 1116 may be coupled to any suitable auxiliary electronic device(s) including but not limited to: one or more batteries, one or more fuel cells, one or more vehicle accessories, or one or more AC-to-DC inverters, for example.

In some examples, the first side 1108 may be the only side that is free from being coupled to an additional module (that is, any one of the other sides and the first and second sections may be coupled to a module if necessary). It is to be understood that, although FIG. 11C shows a lid or cover disposed at each of the first section 1104 and the side 1110, the lid or cover may be removed or absent when the additional module is to be coupled to the module 102 as necessary.

In some examples, the high voltage junction box assembly 100 may be electrically coupled to an external AC-to-DC inverter and structured to receive a high voltage DC electrical power therefrom. In some embodiments, the high voltage junction box assembly 100 includes various fuses, breakers, etc., for different electrified-accessory loads connected to the high voltage junction box assembly 100, as shown in FIGS. 2A and 2B. In some embodiments, the high voltage junction box assembly 100 may be structured to function as a distribution point that provides the high voltage DC electrical power to one or more electrical paths. In some embodiments, the high voltage junction box assembly 100 may be structured to provide the high voltage DC electrical to more than or less than three electrical paths (e.g., one, two, four, five, etc.). By way of example, the architecture of the connection between the high voltage junction box assembly 100 and the accessories of an electrified accessories system may be application specific and/or depend on vehicle type (e.g., a transit bus may have a different architecture and accessories than a passenger car, etc.) as known in the art.

Advantages of implementing the modular design in a junction box assembly include its scalability and flexibility of allowing the base module and additional module(s) to be interchangeable and replaceable when they are old or malfunctioning, with relative ease and without the need to completely replace the entire assembly. For example, when a component or components within a certain module needs to be replaced, only the module may be replaced instead of the entire junction box, as would be necessary in a predesigned junction box, since when components in such predesigned junction box that is tailored for a specific application malfunction, it would sometimes be necessary to replace the entire junction box because of the complex ways in which the inner components of such junction box may be interconnected, so it may not be simple, recommended, or even possible to only replace portions of the junction box. In comparison, the junction box assembly as presently disclosed use modular components that are only coupled to each other via limited connections, such as via certain buses or wires, so each module is easily replaceable with another module and still maintain functionality of the junction box assembly as a whole after the replacement, without requiring further servicing or special maintenance. Furthermore, using a common casing for multiple different modules may reduce cost and improve the case of assembly. Furthermore, the design of the junction box assembly may be minimized or expanded to be utilized in different types of vehicles or systems, in various ranges and applications. Furthermore, the mix-and-match versatility of the design makes it easier for the technicians or manufacturer to offer a quote for component manufacturing. Furthermore, due to the common designs, validation time may be reduced.

Disclosed below are some examples of how the assembly 100 may be implemented according to different applications.

According to some examples, the base module 102 includes a dual traction inverter, four (4) accessory ports, a standard charging port (with positive and negative connections), a test port, and four (4) battery connections. The additional module 104 includes eight (8) additional accessory ports, and either four (4) additional battery ports for EV application or two (2) additional DC-DC connections for fuel cell applications. The additional module 108 includes a pantograph or induction charging capability, as well as a 1800-ampere capacity. In some examples, the housing 103, 105, 107, and 109 may be designed such that the lift points of the housing are shifted outwardly with respect to the corners of the housing as the modules are coupled to one another, thereby blocking off the inner lift points of the housing; furthermore, mount points may be added as the modules are coupled with each other. As an illustrative example, lift points 1118 are shown in FIG. 11C protruding from the first side 1108 of the housing 103 of the base module 102. In some examples, the housing may implement a split-compartment design that keeps the positively charged circuits on a top side and the negatively charged circuits on a bottom side opposite from the top side. The top and bottom sides may be implemented in layered configuration inside the housing, where the top side is closer to the first section 1104 and the bottom side is closer to the second section 1106, for example.

Some of the applications for which the high voltage junction box assembly 100 may be implemented include: transit bus, school bus, and terminal tractor. For each of these applications, the requirements or preference for the number of battery connections, accessory connections, accessory current range, motor inverter inputs, charging connections, test port(s), the presence of a master disconnect switch (MDS), lifting provisions, fuel cell connection, presence of connector protection, and working DC voltage range are shown below in Table 1.

In view of the above, a user has the option to mix-and-match different modules according to the needs of the application as shown in Table 1, by referring to the options available in Table 2. As such, there is no need for the user to specifically order a new junction box that is tailor-designed for the transit bus, school bus, or terminal tractor application, thus allowing the user to save time and money by making it easier to customize their preferred junction box assembly using the available modules. In some examples, the electrical current range (in amperes or A) may be from 5 A to 10 A, 10 A to 15 A, 15 A to 20 A, 20 A to 30 A, 30 A to 40 A, 40 A to 50 A, or any other range therebetween or any suitable combination of ranges thereof. In some examples, the voltage range (in volts or V) may be from 400 V to 500 V, 500 V to 600 V, 600 V to 700 V, 700 V to 800 V, 800 V to 900 V, 900 V to 1000 V, or any other range therebetween or any suitable combination of ranges thereof.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner and in any suitable order while still providing the described operation and results. It is

TABLE 1

Comparison of different requirements/preferences in transit bus, school bus, and terminal tractor applications for the junction box

|  | TRANSIT BUS | SCHOOL BUS | TRACTOR |
| --- | --- | --- | --- |
| Battery Connections | 6 to 8 | 3 | 3 to 4 |
| Accessory Connections | 6 | 12 | 11 |
| Accessory Current Range | 5-50 amperes | 5-20 amperes | 5-50 amperes |
| Motor Inverter Inputs | 1 | 1 | 1 |
| Charging Connections | 3 | 1 | 1 |
| Test Ports | 1 | 1 | 1 |
| MDS | 1 | 0 | 0 |
| Lifting provisions | 4 | 2 | 4 |
| Fuel Cell Connection | 0 | 0 | 0 |
| Connector Protection | Yes | No | Yes |
| Working Voltage Range (DC) | 400-800 V | 400-800 V | 400-800 V |

In order to meet the demands of these different applications, the assembly 100 may implement any suitable number or combination of the modules 102, 104, 106, 108, etc., as currently disclosed, including but not limited to the ports and components implemented therein. Table 2 below shows the possible options offered by each of the modules according to some embodiments.

TABLE 2

Comparison of different options available in the modules

|  | Base Module (102) | 2nd Charge Module (106) | Opportunity Charge Module (108) | EV Power Module (104, FIG. 1B) | Fuel Cell Module (104, FIG. 3) |
| --- | --- | --- | --- | --- | --- |
| Battery Connections | 4 | 0 | 0 | 4 | 0 |
| Accessory Connections | 4 | 0 | 0 | 8 | 8 |
| Accessory Current Range | 5-20 A | N/A | N/A | 5-50 A | 5-50 A |
| Motor Inverter Inputs | 2 | N/A | N/A | N/A | N/A |
| Charging Connections | 1 (450 A) | 1 (450A) | 1 (1800A) | N/A | N/A |
| Test Ports | 1 | N/A | N/A | N/A | N/A |
| MDS | 0 | 0 | 0 | 0 | 0 |
| Lifting provisions | 4 | 1 | 1 | 1 | 1 |
| Fuel Cell Connection | 0 | 0 | 0 | 0 | 1 |
| Connector Protection | Yes | Yes | Yes | Yes | Yes |
| Working Voltage Range (DC) | 400-800 V | 400-1000 V | 400-1000 V | 400-1000 V | 400-1000 V |

What is claimed is:

1. A high-voltage junction box module comprising:
   a housing having a first section and a second section opposing the first section, the housing having a first side, a second side, a third side, and a fourth side extending from the first section to the second section;
   a plurality of electrical ports disposed at the first side of the housing;
   a plurality of buses contained within the housing and configured to operatively control electrical flow and electrical connection between auxiliary electronic devices that are electrically coupled with the junction box module via the electrical ports; and
   at least one interface having one or more coupling sections disposed at one or more of the second side, the third side, the fourth side, the first section, or the second section, the interface configured to physically and electrically couple the junction box module directly with an additional junction box module.

2. The junction box module of claim 1, wherein the additional junction box module includes additional electrical ports.

3. The junction box module of claim 1, wherein the at least one interface is configured to detachably couple the additional junction box module with the junction box module.

4. The junction box module of claim 1, wherein the additional junction box module includes an additional housing comprising a plurality of additional electrical ports disposed at the additional housing.

5. The junction box module of claim 1, wherein the electrical ports are configured to facilitate transfer of electric current range of from about 5 amperes to about 20 amperes or of electric voltage range of from about 400 DC volts to about 800 DC volts.

6. The junction box module of claim 1, further comprising a safety switch, wherein the housing includes a removable lid coupled to the first section or the second section, and the removable lid is functionally coupled with the safety switch, wherein the safety switch is configured to detect a presence or absence of the removable lid.

7. The junction box module of claim 1, wherein the electrical ports includes a test port configured to indicate presence of a residual voltage inside the junction box module.

8. The junction box module of claim 1, wherein the auxiliary electronic devices include one or more of: a battery, a fuel cell, a vehicle accessory, or an AC-to-DC inverter.

9. The junction box module of claim 1, wherein the second side of the housing includes a first interface configured to physically and electrically couple the junction box module directly with a first additional junction box module, and the third side of the housing includes a second interface configured to physically and electrically couple the junction box module directly with a second additional junction box module.

10. The junction box module of claim 9, wherein the second side and the third side are two adjacent sides of the housing.

11. The junction box module of claim 9, wherein the second side and the fourth side are two opposing sides of the housing.

12. The junction box module of claim 9, wherein the first section of the housing includes a third interface configured to physically and electrically couple the junction box module directly with a third additional junction box module.

13. The junction box module of claim 12, wherein the second section of the housing includes a fourth interface configured to physically and electrically couple the junction box module directly with a fourth additional junction box module.

14. A high-voltage junction box assembly comprising:
   a primary high-voltage junction box module comprising:
      a primary housing,
      a plurality of primary electrical ports disposed at the primary housing, and
      a first connection bus contained within the primary housing and configured to operatively control electrical flow and electrical connection between primary auxiliary electronic devices that are electrically coupled with the primary junction box module via the primary electrical ports; and
   a secondary high-voltage junction box module coupled to the primary high-voltage junction box module, the secondary high-voltage junction box module comprising:
      a secondary housing,
      a plurality of secondary electrical ports disposed at the secondary housing, and
      a second connection bus contained within the secondary housing and configured to operatively control electrical flow and electrical connection between secondary auxiliary electronic devices that are electrically coupled with the secondary junction box module via the secondary electrical ports,
   wherein the primary housing and the secondary housing are removably coupled via an interface comprising one or more coupling sections disposed at the primary housing or the secondary housing, the interface configured to physically and electrically couple the primary junction box module directly with the secondary junction box module.

15. The high-voltage junction box assembly of claim 14, further comprising a third high-voltage junction box module coupled to the primary high-voltage junction box module.

16. The high-voltage junction box assembly of claim 14, wherein the interface is configured to detachably couple the secondary high-voltage junction box module with the primary high-voltage junction box module.

17. The high-voltage junction box assembly of claim 14, wherein the primary and secondary electrical ports are configured to facilitate transfer of electric current range of from about 5 amperes to about 20 amperes or of electric voltage range of from about 400 DC volts to about 800 DC volts.

18. The high-voltage junction box assembly of claim 14, at least one of the primary and secondary high-voltage junction box modules comprising a safety switch, wherein the primary or secondary housing includes a removable lid, and the removable lid is functionally coupled with the safety switch, wherein the safety switch is configured to detect a presence or absence of the removable lid.

19. The high-voltage junction box assembly of claim 14, wherein the primary or secondary electrical ports includes a test port configured to indicate presence of a residual voltage inside the primary and secondary junction box modules.

20. The high-voltage junction box assembly of claim 14, wherein the primary and secondary auxiliary electronic devices include one or more of: a battery, a fuel cell, a vehicle accessory, or an AC-to-DC inverter.

\* \* \* \* \*